US010534832B1

(12) United States Patent
Miller et al.

(10) Patent No.: US 10,534,832 B1
(45) Date of Patent: Jan. 14, 2020

(54) SERVER-SIDE TRACKING AND SELECTION OF ROTATING CONTENT

(71) Applicant: Amazon Technologies, Inc., Reno, NV (US)

(72) Inventors: John Martin Miller, Seattle, WA (US); Michael Lee Loritsch, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 79 days.

(21) Appl. No.: 15/800,929

(22) Filed: Nov. 1, 2017

(51) Int. Cl.
*G06F 16/957* (2019.01)
*H04L 29/06* (2006.01)
*H04L 29/08* (2006.01)
*G06F 16/2455* (2019.01)
*H04N 21/431* (2011.01)
*H04N 21/25* (2011.01)
*H04N 21/81* (2011.01)
*H04N 21/433* (2011.01)
*H04N 21/258* (2011.01)
*H04N 21/482* (2011.01)

(52) U.S. Cl.
CPC .... *G06F 16/9574* (2019.01); *G06F 16/24552* (2019.01); *H04L 67/2842* (2013.01); *H04L 67/42* (2013.01); *H04N 21/251* (2013.01); *H04N 21/25883* (2013.01); *H04N 21/25891* (2013.01); *H04N 21/4316* (2013.01); *H04N 21/4331* (2013.01); *H04N 21/4826* (2013.01); *H04N 21/812* (2013.01)

(58) Field of Classification Search
CPC .......... G06F 16/9574; G06F 16/24552; H04L 67/2842; H04L 67/42; H04N 21/251; H04N 21/25883; H04N 21/25891; H04N 21/4316; H04N 21/4331; H04N 21/4826; H04N 21/812
USPC ......................................................... 709/203
See application file for complete search history.

(56) References Cited

U.S. PATENT DOCUMENTS

| 2007/0058937 | A1* | 3/2007 | Ando | G11B 27/105 386/248 |
| 2008/0228864 | A1* | 9/2008 | Plamondon | G06F 16/9574 709/203 |
| 2015/0220235 | A1* | 8/2015 | Tully | G06Q 30/0271 715/760 |
| 2016/0085682 | A1* | 3/2016 | Johnson | G06F 16/9574 707/692 |
| 2017/0185619 | A1* | 6/2017 | Choubey | G06F 16/172 |

* cited by examiner

*Primary Examiner* — Kristie D Shingles
(74) *Attorney, Agent, or Firm* — Hogan Lovells US LLP (57) ABSTRACT

Systems and methods for selecting, storing, and displaying content items are provided, in which complex content selection logic is performed at a content provider environment (i.e., server-side) and selected content items are transmitted to and stored locally at a client device. Thus, the client device can quickly load a content item for display when a content display opportunity occurs, rotating through the stored content items with relatively simple logic. The client device may transmit a request to the content provider for more content if the amount of available content items is below a threshold. The content provider then runs content selection logic designated for the specific client device and selects one or more new content items to transmit to the client device.

20 Claims, 9 Drawing Sheets

SERVER-SIDE TRACKING AND SELECTION OF ROTATING CONTENT

BACKGROUND

Electronic devices, such as televisions, tablets, e-readers, are increasingly becoming network connected devices, allowing such devices to download content and communicate with a server over the Internet. In some applications, such devices are configured to automatically display certain content, such as an advertisement. Although these devices are connected to the Internet, it is beneficial to cache some content locally on the device so that content can be available as soon as the user turns on the device, decreasing the latency that may exist if the device has to make a call to a server to fetch content to display at start up, thereby providing faster content rendering for an improved user experience. The selection of content to be displayed for each display instance on the client device may be subject to a set of rules (e.g., display order of certain content, display frequency of certain content) requiring the client device to carry out the logic of content selection. The rules of content selection may change frequently, and the software on the client device needs to be updated to support the new logic. However, updating client-side software can be complex and resource intensive.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for electronic content delivery In particular, various embodiments provide techniques for selecting, storing, and displaying content items are provided, in which complex content selection logic is performed at a content provider environment (i.e., server-side) and selected content items are transmitted to and stored locally at a client device. Thus, the client device can quickly load a content item for display when a content display opportunity occurs, rotating through the stored content items with relatively simple logic. By performing the complex computing required to select and order the content items at the server instead of at the client device, client-side software can be simplified, using less of the limited amount of computational resources that might be available on a client device, while the next content item can be loaded from cache and displayed on at the client device with minimal latency.

In various embodiments, a networked client device (e.g., smart TV, tablet, laptop, mobile phone) may display rotating content items, such as advertisements or notices, at a designated region of a rendered page. The content item displayed at the designation region may change or rotate over time or upon certain triggers, such loading of the page or at certain time intervals. In order to swiftly load and render the content items at the client device with minimal latency, one or more content items may be stored locally at the client device (i.e., cached). When a new opportunity to display a content item arises, an available content item is retrieved from the cache and rendered for display on the client device. In some embodiments, the content items may be sequentially ordered and the content device retrieves the next available content item in the sequence upon detecting a display opportunity. When a content item is displayed, also known as an "impression", an impression of that content item is recorded. In some embodiments, a content item may have a maximum number of available impressions before "running out". In other words, the content items stored in cache may be consumable. The client device can detect when the number of available content items or content item impressions in the cache is below a threshold, and request more content items from a content server. For example, it may be designated that the client device have two content items stored in cache at all times. Thus, the client device could detect when the number of available content items in cache has fallen below two and transmit a request to the content server to download more content items. In at least some embodiments, the content display logic on the client device can be as simple as rendering the next available content item from cache, detecting if the number of available content items is below a threshold, and transmitting a request to download more content items. More complex logic for selecting and ordering the content items for display may be executed at a content server (i.e., content provider) remote from the client device.

Specifically, in various embodiments, the content server may receive a request for content sent from the client device. In some embodiments, the content server may also receive content display data from the client device, which may include a record of previously displayed content items.

Triggered by the request, the content server may access a database to look up a content plan for the client device, in order to determine the content items to serve to the client device. In various embodiments, the content plan generally dictates which content items are to be displayed on the client device as well as other directives such as the display duration and/or frequency of a content item, the order in which to display the content items, and various other instructions regarding selection and use of the content items.

The content plan for the client device, including the selection and ordering of content items, may be determined based on a set of local or global constraints, a profile of the client device, or both. For example, a local constraint may include a maximum number of times (i.e., impressions) a certain type of content item can be displayed on a single client device each day. An example of a global constraint may be a maximum number of times (i.e., impressions) a certain type of content item can be displayed across a plurality of client devices, such as an entire network of client devices. The profile of the client device may include data associated with the client device such as device type (e.g., whether the device is a TV, a tablet, a laptop, etc.), user demographic information of a user account on the client device, or historical behavior data (e.g., amount of time the device is in use, amount of time offline, user selection of certain display content).

In various embodiments, once the content plan is known, the content display data (e.g., most recent content impressions on the client device) may be used to determine a current state of the content plan. Then one or more content items can be selected based on the current state of the content plan and transmitted to the client device in response to the request. These content items are then cached at the client device for fast loading upon detecting content display opportunities.

Various other features and application can be implemented based on, and thus practice, the above described technology and presently disclosed techniques. Accordingly, approaches in accordance with various embodiments at least provide improvements to data loading and rendering capabilities of devices, among other technical advantages. Reducing latency caused by data transmission and loading is a fundamental challenge of computer devices, due at least in part to resources constraints like bandwidth and physical device limitations such as processor speed and memory size. By always caching a minimal amount of data on the client side and pushing more complex computations, such as those required for generating and running the content plan, to the server side, the client device is able to load data quickly without needing to perform the heavy computations for selecting the data. Since the computations to select the data are performed at the server, the client device is free to perform other processing at that time and receive the selected data from the server before that data needs to be rendered. This provides significant performance improvements for the client device. Additionally, keeping the computational logic of the client-side software simple allows the software to run faster, more consistently, and with fewer updates required, since updates can be made at the server side, which is more resource efficient and reliable. Various other applications, processes, and uses are presented below with respect to the various embodiments, each of which improves the operation and performance of the computing device(s) on which they are implemented.

Figure 1A:
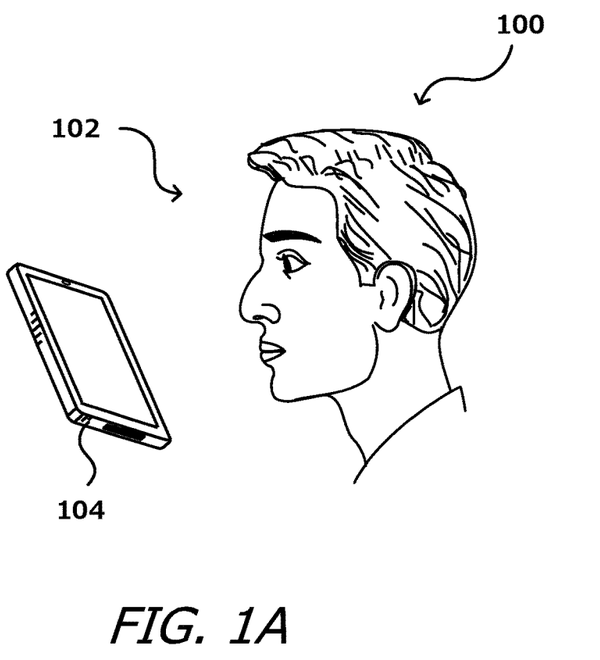
FIG. 1A illustrates an example scenario of a user utilizing a computing device.

FIG. 1A illustrates an example implementation 100 where a user 102 is interacting with a computing device 104, in accordance with various embodiments. In this example, a user 102 interacts with an electronic device 104 to view content. The device 104 is a network connected device and may display various types of content. Although a portable computing device (e.g., an electronic book reader, smart phone, or table computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, wearable computers (e.g., watches, glasses, etc.) and portable players, among others. In this example, the computing device can have executing thereon a content rendering service that can display content. An example of content data can include, for example, rich media content, advertisements, graphics, text, selectable elements, etc. In various embodiments, the device 104 may include settings or preferences defined by the user 102 and/or be associated with a user account. Various user-based information may be obtained from the device 104 including demographic information of the user 102 as well as behavior and usage data, such as how often the device 104 is active, what types of activities the device 102 is used for, and how the user 102 interacts with various content on the device 104. This information may be used to determine what content to serve to the device 102 to optimize the user's experience.

Figure 1B:
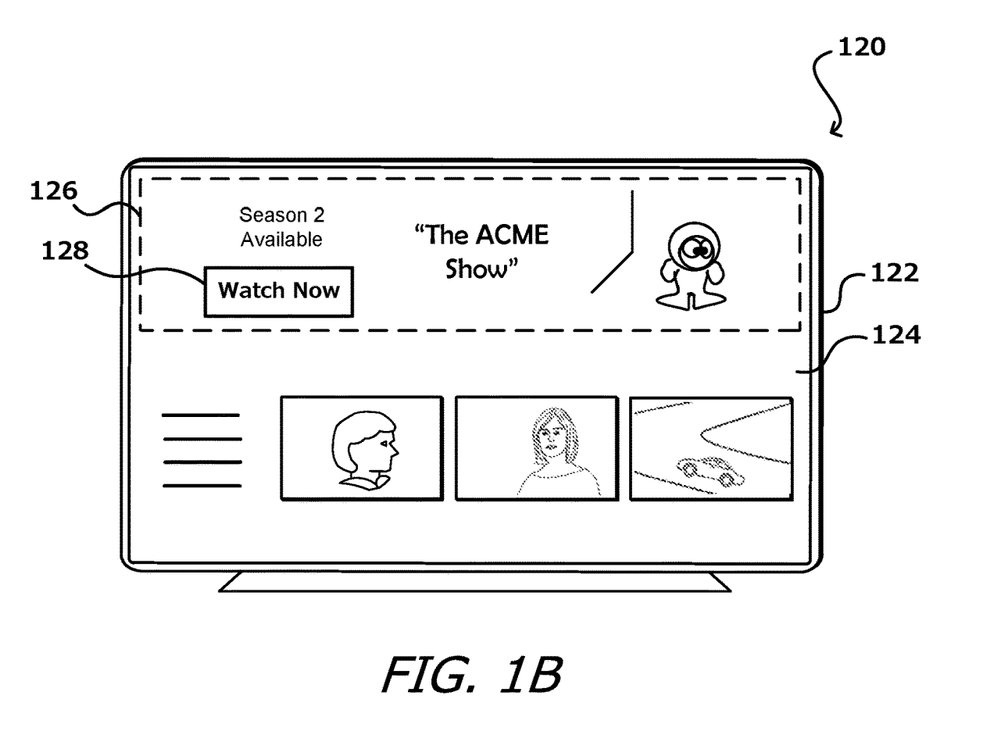
FIG. 1B illustrates an example display of the computing device that can be improved with various embodiments of the present disclosure.

FIG. 1B illustrates an example display of the computing device 120 that can be improved with various embodiments of the present disclosure, in accordance with various embodiments. In this example, a networked television 122 (or other type of networked device) may include a display 124 capable of displaying a wide variety of content. In various embodiments, the device may display rotating content items 126, such as advertisements, at a designated region of a rendered page. The content item 126 displayed at the designation region may change or rotate over time or upon certain triggers, such as loading of the page. Content may include, for example, text, images, audio, animation, video, interactive content, rich media content, advertisements, and other content a user or other object can interact with. Content can be, for example, information provided through text, images, audio, animation, video, interactive content, rich media content, etc. The content can be recommended content because, for example, the content is personalized based on user information associated with a user as may include a user's demographic information, such as gender, age, marital status, occupation, income level, etc., information indicating usage patterns of a computing device, information indicating applications executing on the computing device, a physical location of the computing device, a network provider (Wi-Fi and/or telecom) of the computing device, etc. Content can include a hypertext link or other selectable element 128 that can enable the computing device to launch a web browser, navigate to a particular web site, launch an application, or perform some other function. The web site can be a product page that displays information associated with the content as well as provide the ability to purchase an item represented on the product page. The selectable element 128, when selected, can cause the computing device to perform one of a number of actions. Example actions include launching an application such as a web browser to view a webpage, a marketplace application to download an application, among others. In this example, the interactive element can cause a mobile shopping app to launch, wherein a product page for the shoe as well as any additional or related information can be displayed. In the situation where the user has a passcode or other security measure securing the computing device, the user would first have to provide the necessary passcode before viewing the product page. On the product page, the user can purchase the product, search additional products, or resume operation of the computing device. For example, the displays can include a secondary screen such as an e-ink screen, LCD screen, LED screen, etc. Additionally or alternatively, the display can be a display screen of a device in communication with the computing device such as a smart watch, smart glasses, mobile phone, automobile display, television, electronic book reader, portable media player, among others. As will be appreciated by one of ordinary skill in the art, a product or other content to be represented in recommended content can be a tangible item, a virtual item, a service, or a combination thereof.

In various embodiments, one or more content items may be stored locally at the client device (i.e., cached) in order to load render the content item from cache, which can decreasing the latency that may exist if the device has to make a call to a server to fetch content to display, thereby providing faster content rendering for an improved user experience. However, the selection of which of the cached content items to display for a specific impression may be subject to a set of rules (e.g., display order of certain content, display frequency of certain content), requiring the client device to carry out the logic of content selection. The rules of content selection may change frequently, and the software on the client device needs to be updated to support the new logic. However, updating client-side software can be complex and resource intensive.

Figure 2:
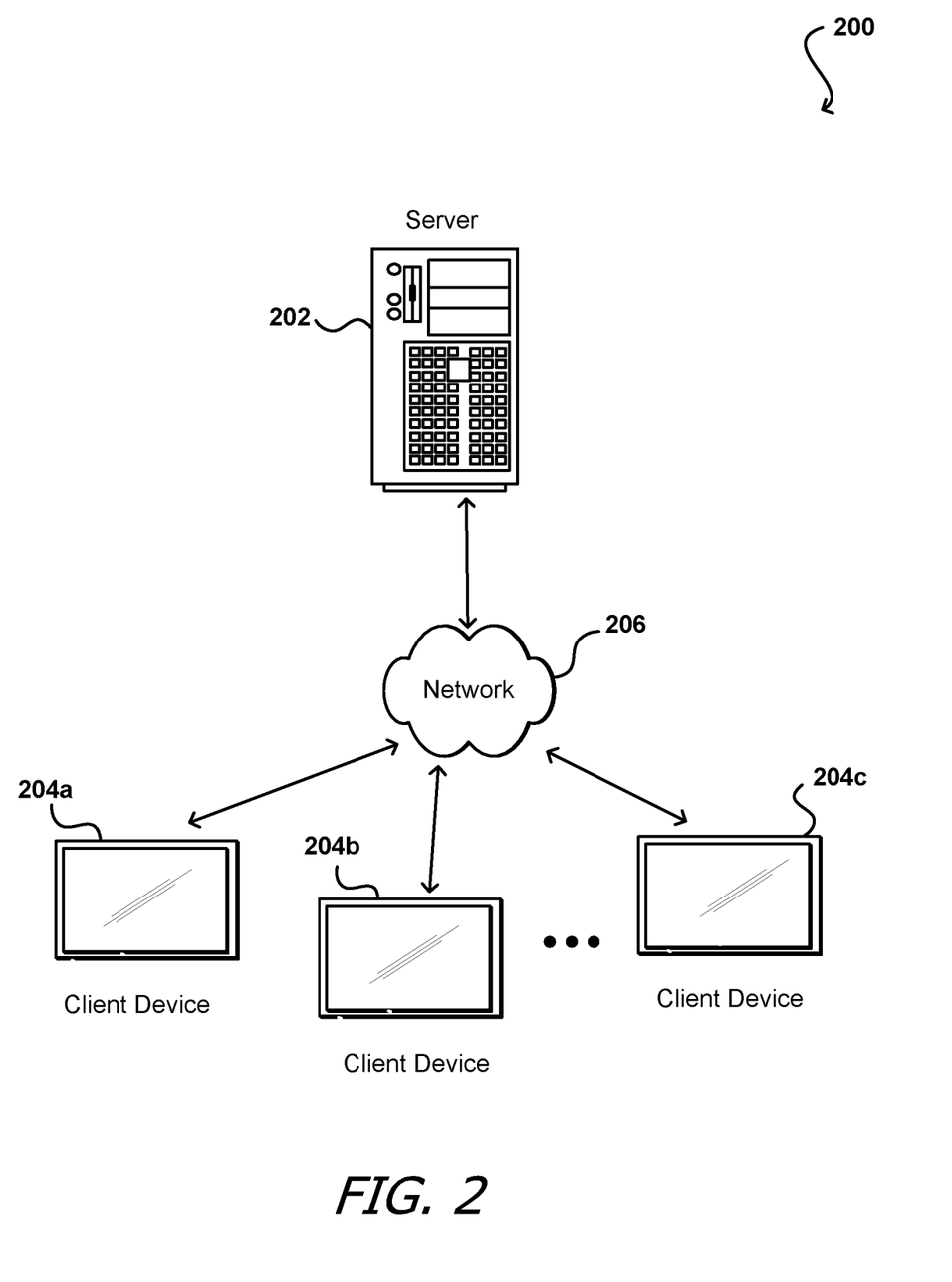
FIG. 2 illustrates an example electronic content delivery network, in accordance with various embodiments of the present disclosure.

FIG. 2 illustrates an example electronic content delivery network 200 for selecting, storing, and display content, in accordance with various embodiments. In this example, a server 202, such as at a resource, service, or content provider can transmit content data, such as content items to one or more client devices 204a, 204b, 204c to be cached and displayed on the client device as content impressions. In some embodiments, the server 202 may also provide display instructions to the client device that may dictate various display parameters of the content items, such as order, frequency, number of impressions, etc. Client devices 204a, 204b, 204c include devices through which a user can watch, listen to, or read content, and include at least one form of input such as a keyboard or controller, and at least one form of output such as a display or speaker. The client devices 204a, 204b, 204c can include various computing devices such as smart phones, tablet computers, smart televisions, wearable computers (e.g., smart glasses or watches), desktop or notebook computers, and the like. The client devices 204a, 204b, 204c can communicate with the server 202 over at least one network 206, such as the Internet, a cellular network, a local area network (LAN), an Ethernet, Wi-Fi, or a dedicated network, among other such options.

In various embodiments, a networked client device, such as client device 204a may display rotating content items, such as advertisements or notices. When a new opportunity to display a content item arises, an available content item is retrieved from local storage on the client device 204a and rendered for display on the client device. The local storage may have a limited number of content items and a limited number of available impressions for each content item. When a content item is displayed, an impression of that content item is recorded. The client device can detect when the number of available content items or content item impressions in the cache is below a threshold, and request more content items from the content server 202. For example, it may be designated that the client device 204a two content items stored in cache at all times. Thus, the client device 204a could detect when the number of available content items in cache has fallen below two and transmit a request to the content server 202 to download more content items. In at least some embodiments, the content display logic on the client device can be as simple as rendering the next available content item from cache, detecting if the number of available content items is below a threshold, and transmitting a request to download more content items. In some embodiments, the content display logic may be based on display instructions that include a number of times to display each content item, a display order, a display time, or other conditions that govern display of the cached content items.

In various embodiments, the server 202 may receive the request for content sent from the client device 204a. In some embodiments, the server 202 may also receive content display data (i.e. impressions data) from the client device, which may include a record of previously displayed content items. Triggered by the request, the content server may access a database to look up a content plan for the client device, in order to determine the content items to serve to the client device. In various embodiments, the content plan generally dictates which content items are to be displayed on the client device under certain conditions as well as other directives such as the display duration and/or frequency of a content item, the order in which to display the content items, and various other instructions regarding selection and use of the content items.

The content plan for the client device 204a, including the selection and ordering of content items, may be determined based on one or more content constraints. In some embodiments, the content constraints include one or more local constraints, one or more global constraints, or both. The local constraints may define content selection and ordering pertaining to the individual client device 204a and the global constraints define content selection and ordering across the network of client devices. For example, a local constraint may include a maximum number of times (i.e., impressions) a certain type of content item can be displayed on a single client device each day. An example of a global constraint may be a maximum number of times (i.e., impressions) a certain type of content item can be displayed across a plurality of client devices, such as an entire network of client devices. The profile of the client device 204a may include data associated with the client device such as device type (e.g., whether the device is a TV, a tablet, a laptop, etc.), user demographic information of a user account on the client device, or historical behavior data (e.g., amount of time the device is in use, amount of time offline, user selection of certain display content).

In various embodiments, a master content plan may include respective content plans for the network of client devices 204a, 204b, 204c. The master content plan defines respective content items and display instructions for the network of client devices 204a, 204b, 204c based at least in part on respective profiles of the network of client devices and content impression constraints. For example, the client devices 204a, 204b, 204c in the network may include different types of devices, different types of users, exhibit different usage behaviors, etc., and therefore may be served different content or different display instructions. However, the master content plan may have a constraint such as a global constraint like a target number of impressions for a certain content item. Thus, the impressions may be distributed amongst all or a subset of the client devices 204a, 204b, 204c and become a part of their respect content plans. In some embodiments, the master content plan may be represented as an array in which rows represent the client devices 204a, 204b, 204c and columns represent the content items that need to be served. The client devices 204a, 204b, 204c may have respective attributes (e.g., user data, interaction/behavior data, device type, etc.) and the content items may also have respective attributes (e.g., maximum impressions, display size, target audience). Thus, a plan of which content items, and in some embodiments how many impressions of each content item, to serve to each client device 204a, 204b, 204c can be defined in the array, and a row in the array represents the content plan for a single client device.

In various embodiments, certain decision such as the content plans for individual client devices may be determined using various models, such as machine learning models which learn how certain profile parameters affect interactions with or other results of displaying certain content items, such that the content plans can be optimized for user engagement. For example, interaction data (e.g., selections, time spent on the application, purchases) associates with a certain content item being displayed on a certain client device can be used as a training data for better assigning content items to client devices in the further.

In various embodiments, once the content plan is known, the content display data (e.g., most recent content impressions on the client device) may be used to determine a current state of the content plan and thus which content items still need to be served. Then one or more content items can be selected based on the current state of the content plan and transmitted to the client device in response to the request. In some embodiments, the number of content items to select and transmit to the client device 204a may be based on device type, an amount of time the client device is offline, a frequency of content impressions on the client device, usage data of the client device, or a user profile associated with the client device, or any combination thereof. For example, a device that is offline for long periods of time but has high usage may be served a higher number of content items or impressions. In some embodiments, the number of content items to transmit to the client device may be adjusted based on a change to the content plan or a change in behaviors associated with the client device. For example, the number of content items to serve at a time may increase in response to detecting an increase in the frequency of requests, which may be an indicating of the content items being consumed at an increased rate and it may be advantageous to have more in cache. In some embodiments, before transmitting the selected content items to the client device 204a, the selected content items may be validated to determine whether they are still valid or available for display. For example, if a selected content item is a promotion for an event that has already passed, the content item may no longer be available to be served.

Once the content items are received from the server 202, the content items are cached at the client device 204 for fast loading upon detecting content display opportunities. In various embodiments, the content items are displayed at the client device 204 based on a client-side display scheme. For example, the content items are transmitted to the client device 204 in a sequence, and the client-side content display scheme includes displaying the one or more content items according to the sequence. In another example, the client-side content display scheme includes a maximum number of times a certain content item can be displayed per certain amount of time, or other rules governing the display of cached content items. In some embodiments, the content display scheme is defined by display instructions received from the server 202 with along with the content items.

Figure 3:
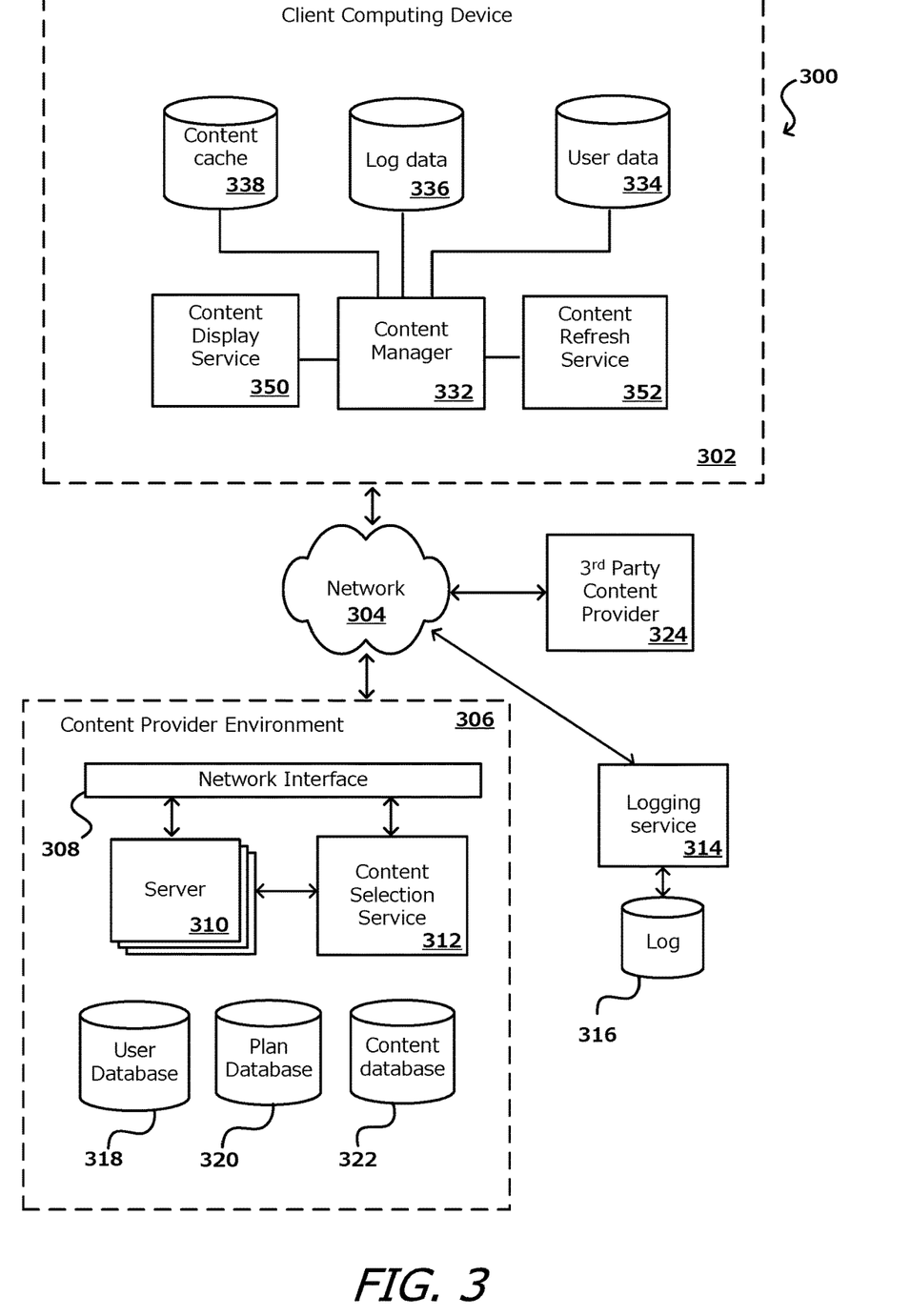
FIG. 3 illustrates and example electronic content delivery system, in accordance with various embodiments of the present disclosure.

FIG. 3 illustrates and example electronic content delivery system 300, in accordance with various embodiments. In this example, a client computing device 302 (e.g., similar to computing device 104 in FIG. 1A) is able to receive content across at least one network 304 from an appropriate content provider environment 306. The client computing device 302 can generally include a content manager 332, a content display service 350, a content refresh service 352, user data store 334, log data store 336, and client content data store 338. In certain embodiments, the client can include a security component to detect and combat programmatic circumvention of determining, displaying, and updating the content. The content cache 338 can store the content items received from the content provider environment, as well as other information such as display instructions. The display instructions can be provided by a content provider environment 306 or other such environment and can be used to determine a display schedule by which to display and update content on the client computing device as well as logic for displaying the cached content items such as duration, frequency and order. For example, the display instructions may be relatively simple, such a instructing the client computing device to display the next available content item stored in cache upon detecting a content display opportunity, or the request more content from the provider environment 306 if the number of available content items is below a threshold number.

As described herein, the display instructions can be periodically and automatically updated. For example, the content provider environment can include a service (e.g., an update service) operable to generate updates to the display instructions and can propagated the updates to the client computing device 302. The content items can be chosen personalized based on user information associated with a user of the client computing device and can be formatted for optimal display on the client computing device, taking into consideration various specifications of the client computing device (e.g., screen size, screen resolution, etc.) The content items can be provided by a content provider of the content provider environment. In accordance with various embodiments, the content items can be provided to the content provider environment from a third party content provider 324 or other such entity. The log data 336 may include a record of content impressions that have occurred, including an ordered log of impressions, or list of content items displayed over a certain period of time and the number of impressions of each of the content items.

The user data store 334 can include usage information pertaining to the client computing device 302 as may include user information including demographic information (e.g., gender, age, marital status, occupation, income level, etc.) and behavior information (e.g., interactions with various content, purchasing habits, etc.), information indicating usage patterns of a computing device (e.g., amount of time connected to the network, amount of time offline, number of page refreshes, number of content display opportunities, etc.), information indicating applications executing on the computing device, a physical location of the computing device, a network provider (Wi-Fi and/or telecom) of the computing device, etc. The at least one network 304 can include any appropriate network, such as may include the Internet, an Intranet, a local area network (LAN), a cellular network, and the like. The content manager 332 can be used for rendering and updating content. For example, the content manager 332 can receive a refresh notification or other such event/instruction from the content refresh service 352. The refresh notification can be generated in response to detecting a time to refresh the content (e.g., display a new content item) or an event such as opening of a webpage or application. In response to receiving the refresh notification, the content manager retrieves the next available content item stored in the content database 338 to be displayed using content display service 350. The content refresh service 352 can monitor for new impression events such as on a timed interval or page load events. Content refresh service 352 can notify the content manager 332 to initiate content selection, rendering, and display logic. In accordance with various embodiments, as relating to retrieving content and/or display instructions, a request can be received to a network interface layer 308 of the content provider environment 306 for new content items and/or the display instructions.

The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request from the client computing device 302, and cause at least a portion of the information in the request to be directed to an appropriate system or service, such as a server 310 (e.g., a Web server or application server), among other such options, which may carry out the functions by accessing other serves or databases of the content provider environment 306. To generate the display instructions and the content, the servers or other components of the environment might access one or more data stores, such as a user data store 318 that contains information about the various users, and one or more server content data stores 320 storing content able to be served to those users. The user data store 318 can include, for example, purchase history; customer behavior such as application or service usage; user responsiveness to advertisements such as clickthrough rate; social media information; service and/or displayed advertisements; and/or any other information that can be used to indicate user preference to a type of advertisement and/or recommended content. A content selection service 312 can be configured to select content items to serve to the client device 302 for caching. For instance, the content selection service 312 can generate a content plan for the client device 302 and execute the logic for selecting next content items based on the content plan.

In various embodiments, the third party content provider 324 can be, a social media network, news network, an ad network (e.g., a company that connects advertisers to publishers, such as websites or application developers, that host ads), an ad mediator (e.g., an ad tracking platform that enables the allocation of advertising inventory across multiple ad networks), an ad exchange (e.g., a technology platform that facilitates automated auction-based pricing and buying in real-time between advertiser demand and publisher ad supply), or the like. The third party content provider 324 can include or at least be in communication with an advertising manager, the content request service, or other appropriate service, which can include any combination of devices and/or processes operable to encompass, monitor, and/or control a number of different algorithms and components for selecting the content items. In accordance with an embodiment, the content items can be provided to the content provider environment from the third party content provider 324, and the content provider environment can provide the content items to the client computing device. For example, the content renderer, or other component on the client computing device 302 can submit a request for content items. The request can be received by the content provider and the content provider can submit a request for the appropriate content to the third party content provider. The request from the content provider to the third party content provider can include any appropriate information for determining, recommended content. For example, the information can include usage profile and user information (such as demographic information), log information for previously displayed content items, the placement of displayed content items, and/or the appearance of displayed content items, among other information.

In accordance with an embodiment, when the content item is displayed on the client device, the display instructions executing on the client computing device 302 can analyze the properties of the content item displayed to determine whether the user has viewed or otherwise interacted with the recommended content. The information can be provided to the content provider environment, third party content provider, a logging service, or some other entity. For example, the client computing device 302 can then cause at least one call or request to be submitted to a least one logging service 314, within or outside the provider environment 306, where the call or request can include information about the visibility of the advertising, interaction metrics (e.g., a time of day, template to display the recommended content, etc.), among other such options. The information can then be stored to log database 316 or similar location for subsequent analysis. In some cases, the information in the log database 316 will periodically be pulled and transformed to a format that can be stored to a table in the log database 316, for reporting or statistical analysis with other data, enabling various types of reporting and analysis to be performed across various types of data.

Figure 4:
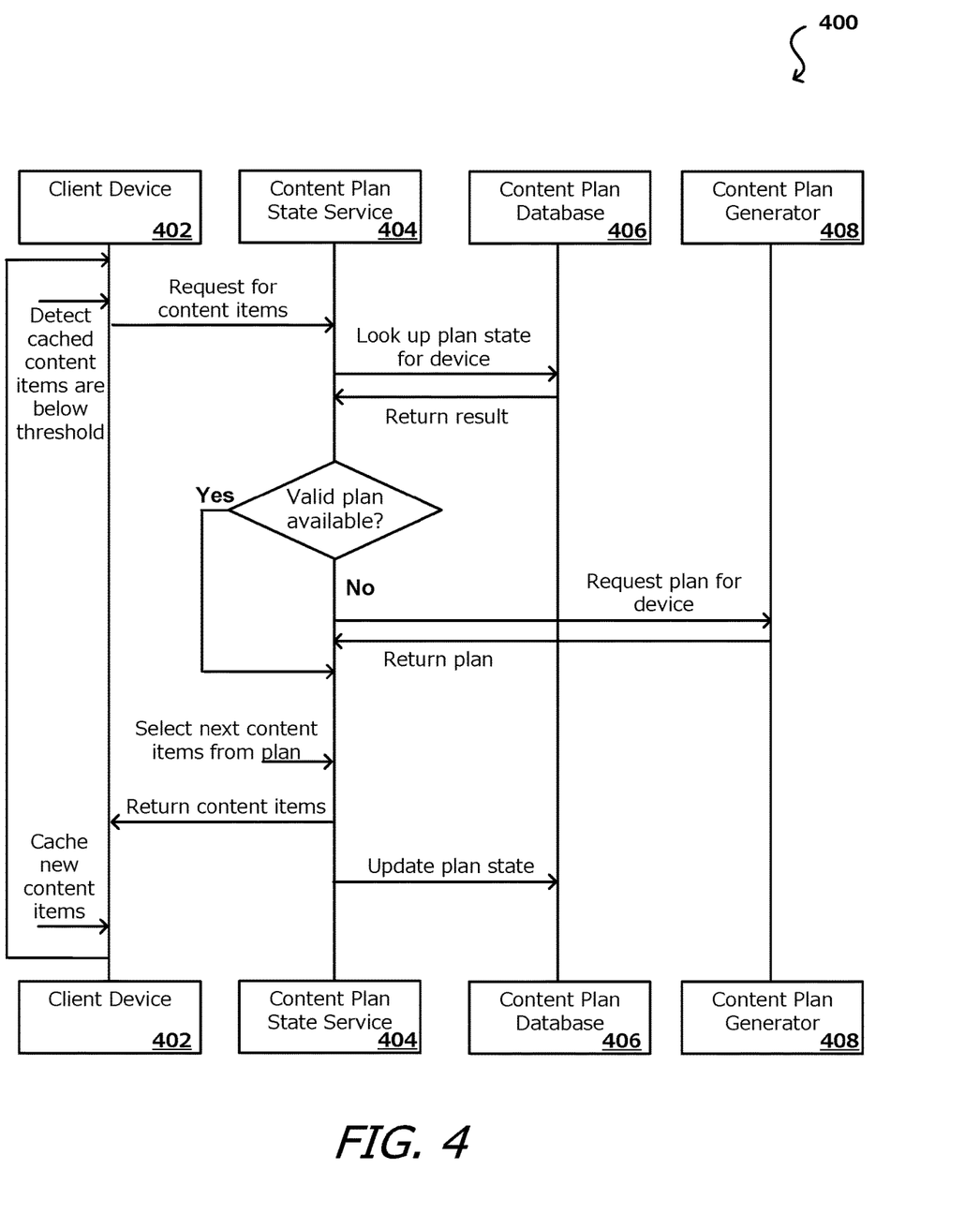
FIG. 4 illustrates an example sequence diagram for electronic content delivery, in accordance with various embodiments of the present disclosure.

FIG. 4 illustrates an example sequence diagram 400 for electronic content delivery, in accordance with various embodiments. In this example, a client computing device 402 detects that cached content items are below a threshold number of content items and transmits a request for content items to a content plan state service 404 of a content provider environment. The content plan state service executes the content plan, maintains a state of the content plan, and selects content items to transmit to the client device based on the current state of the content plan. Upon receiving the request for content items from the client device, the content plan state service 404 accesses a content plan database 406 to look up the plan state for the client device. The content plan database 406 then returns the result of the look up, which may be the plan state if it exists. However, if a valid plan is not available in the database 406, either because no plan exists, or an existing plan is out of date, the content plan state service 404 requests a new plan for the client device 402 from a content plan generator 408. The content plan generator 408 then generates a new plan for the client device and returns the plan to the content plan state service 404. The content plan state service 404 can then select the next content items from the content plan, and returns the selected content items to the client device. The content plan state service 404 also updates the state of the content plan, for example, based on the content items that were transmitted to the client device 402. In some embodiments, the state may indicate a position in a queue of content items. The client device 402, upon receiving the content items, can cache the new content items, which then become available to display.

Figure 5:
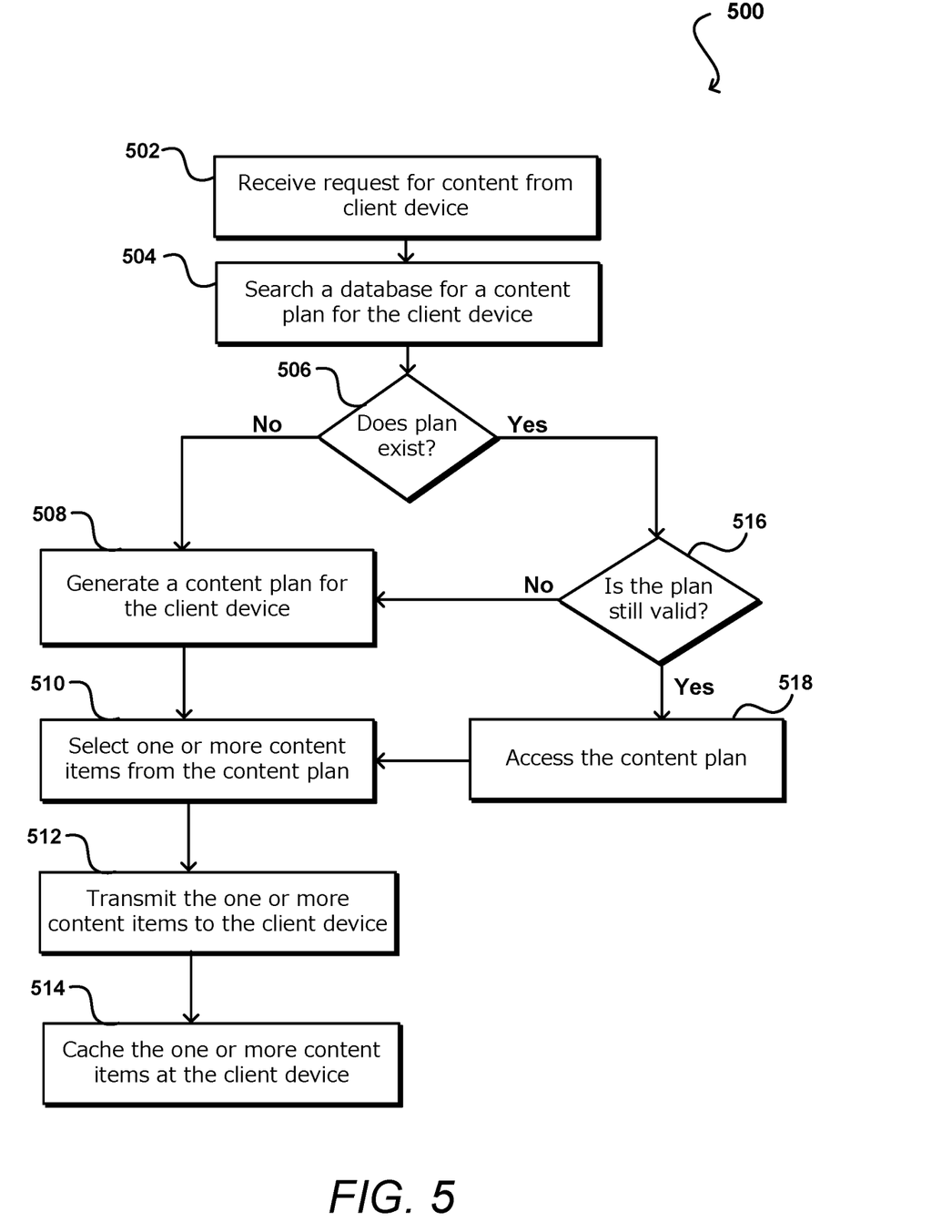
FIG. 5 illustrates an example process of server-side content selection, in accordance with various embodiments of the present disclosure.

FIG. 5 illustrates an example process 500 of server-side content selection, in accordance with various embodiments. It should be understood that, for any process discussed herein, there can be additional, fewer, or alternative steps performed in similar or alternative orders, or in parallel, within the scope of the various embodiments. In this example, a request for content is received 502 from a client device. This may be prompted by the client device detecting that it is running low on cached content available for display. Upon receiving the request, a database is searched 504 to obtain a content plan for the client device. In various embodiments, the content plan determines which content items are to be transmitted to the client device to be cached. content plans may be specific to a certain client device. Accordingly, It can be determined 506 whether a content plan exists for the client device. For example, if a content plan for the client device does not exist in the database, a content plan can be generated 508 for the client device. In some embodiments, a content plan generation service can be accessed to obtain a new content plan for the client device. Once the content plan is generated, one or more content items can be selected 510 from the content plan. As discussed, the content plan may include a queue of content items and the one or more content items may be the next content items in the queue. The selected content items are then transmitted 512 to the client device and cached 514 at the client device. In various embodiments, if it is determined 506 that a content plan does exist in the database, it is then determined 516 whether the plan is still valid. For example, the plan may be invalid if it is out of date, or if some settings or attributes of the client device has changed since the plan was originally generated. Thus, if the plan is no longer valid, then a new content plan can be generated 508 for the device, and used to determine content items to transmit 512 and cache 514 at the client device. If the plan is valid, then the plan can be accessed 518, and similarly used to select 510 content items to transmit 512 and cache 514 at the client device.

Figure 6:
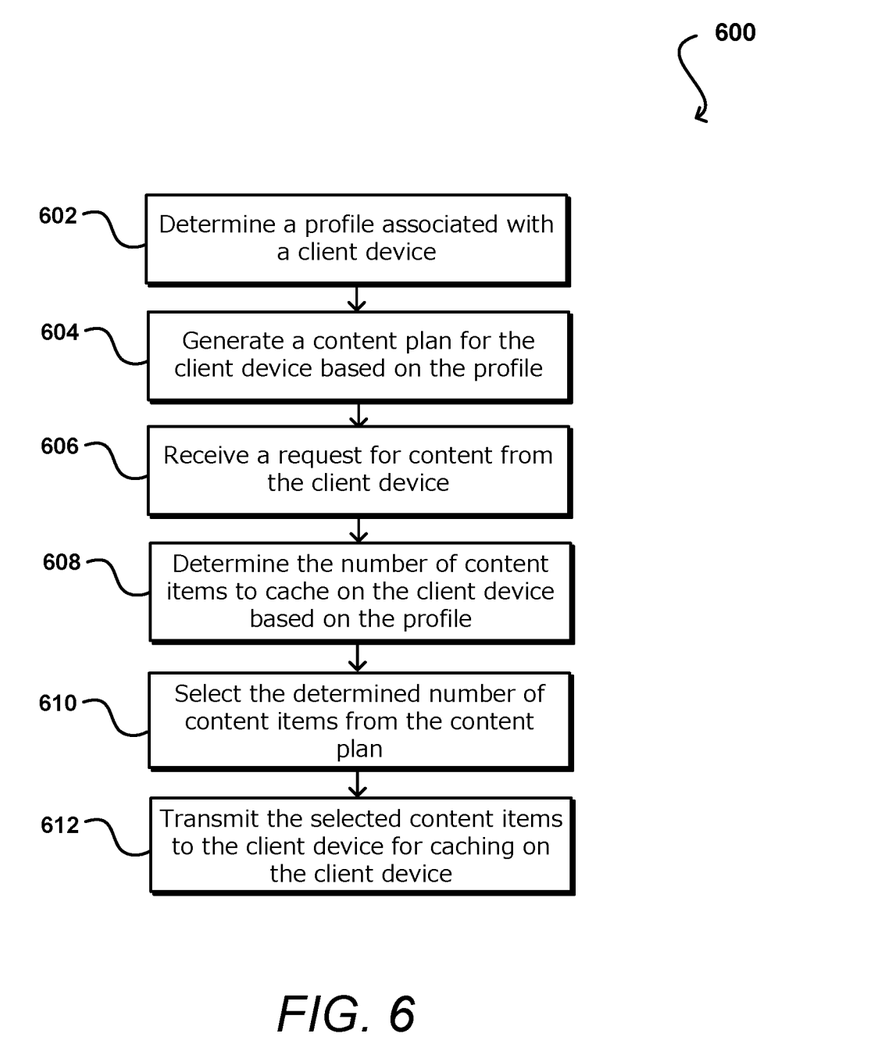
FIG. 6 illustrates an example process of generating a content plan for a client device, in accordance with various embodiments of the present disclosure.

FIG. 6 illustrates an example process 600 of generating a content plan for a client device, in accordance with various embodiments. In this example, a profile associated with a client device can be determined 602. The profile of the client device may include data associated with the client device such as device type (e.g., whether the device is a TV, a tablet, a laptop, etc.), user demographic information of a user account on the client device, or historical behavior data (e.g., amount of time the device is in use, amount of time offline, user selection of certain display content). A content plan for the client device can then be generated 604 based at least in part on the profile. In various embodiments, the content plan generally dictates which content items that are to be displayed on the client device as well as other directive such as the display duration and/or frequency of a content item, the order in which to display the content items, and various other instructions regarding selection and use of the content items. For example, the content plan may include a queue of ordered content items. The content plan for the client device, including the selection and ordering of content items, may be determined based on a set of local or global constraints, a profile of the client device, or both. For example, a local constraint may include a maximum number of times (i.e., impressions) a certain type of content item can be displayed on a single client device each day. An example of a global constraint may be a maximum number of times (i.e., impressions) a certain type of content item can be displayed across a plurality of client devices, such as an entire network of client devices. The content plan can then be used to determine content to cache on the client device when request. Thus, a request for content may be received 606 from the client device. In various embodiments, the number of content items to cache on the client device may be determined 608 based on the profile. For example, the profile may include data regarding the amount of time the device is offline but used by a user, which may affect the amount of content to cache on the client device. For example, if the device is offline for long periods of time but continues to be used, then a larger amount of content may be caches on the client device so that the client device has enough content to rotate through before the device is connected to the network again. The number of content items to cache may also be based on how often the client device makes requests for content. For example, if it is detected that the client device has been making request more frequently, the number of content items to cache may be increased in order to reduce the frequency of request. The determined number of content items (n) can then be selected 610 from the content plan, such as the first n number of content items in a content queue. The selected content items are then transmitted 612 to the client device to be cached thereon.

Figure 7:
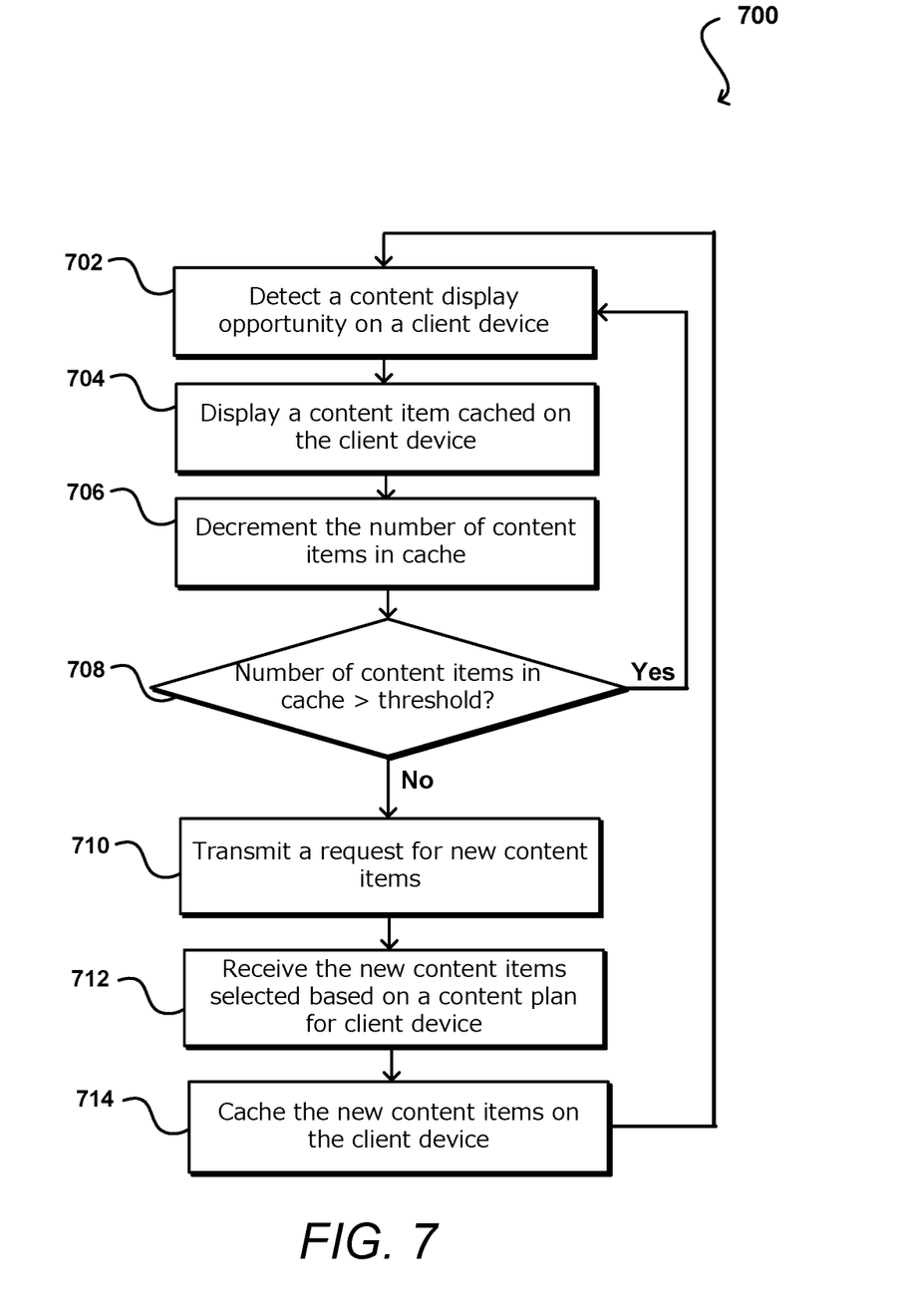
FIG. 7 illustrates an example process of displaying rotating content at a client device, in accordance with various embodiments of the present disclosure.

FIG. 7 illustrates an example process 700 of displaying rotating content at a client device, in accordance with various embodiments. In this example of a client device process, a content display opportunity is detected 702 on a client device. The content display opportunity may be caused by a loading of a page or application or occur on a schedule or upon another type of trigger. Upon detection of a content display opportunity, a cached content item may be displayed 704, otherwise known as an impression. Upon displaying the content item, the number of content items available in the cache is decremented 706 by one. It is then determined 708 if the number of available content items remaining in cache is greater than a threshold number. In some embodiments, this is an indication of the client device having a minimum amount of cached content so that content can be displayed with minimal latency. For example, if there are enough content items remaining in cache, then the process can cycle back to detecting 702 content display opportunities, displaying 704 content items, and decreasing 706 the number of content items in the queue accordingly until it is determined 708 that there are no longer enough content items in cache. When that occurs, a request for new content items is transmitted 710 to a content provider and the new content items are received 712 at the client device. The new content items are cached 714 on the client device and available for use to fill detected 702 content display opportunities.

Figure 8:
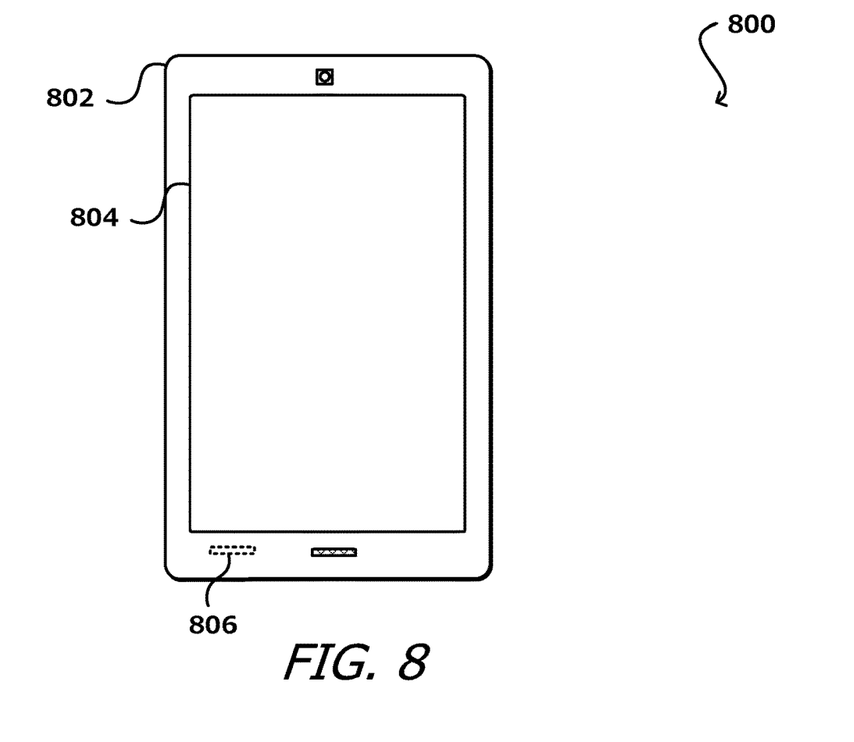
FIG. 8 illustrates an example computing device that can be used, in accordance with various embodiments of the present disclosure.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like.

Figure 9:
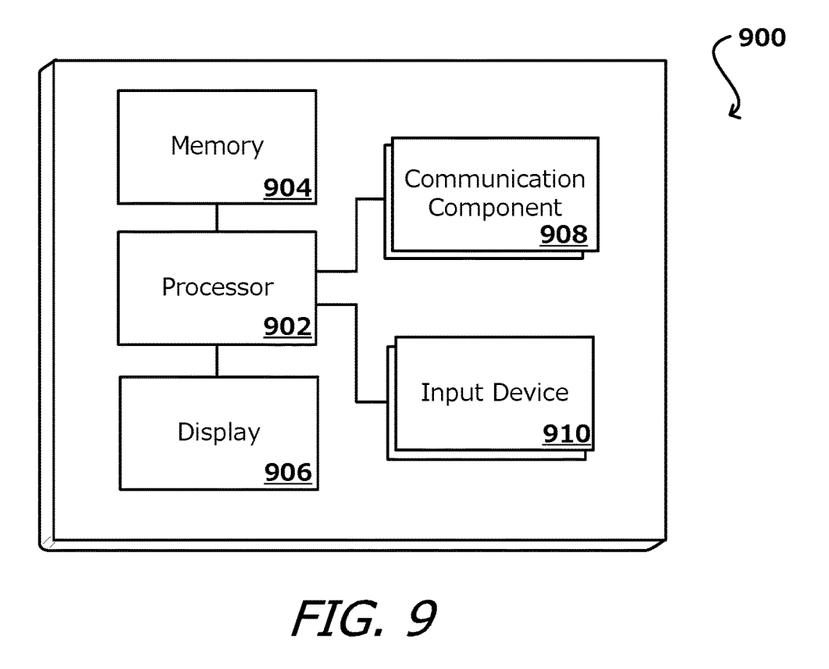
FIG. 9 illustrates a set of basic components of one or more devices of the present disclosure, in accordance with various embodiments of the present disclosure.

FIG. 9 illustrates a set of basic components of one or more devices 900 of the present disclosure. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 10:
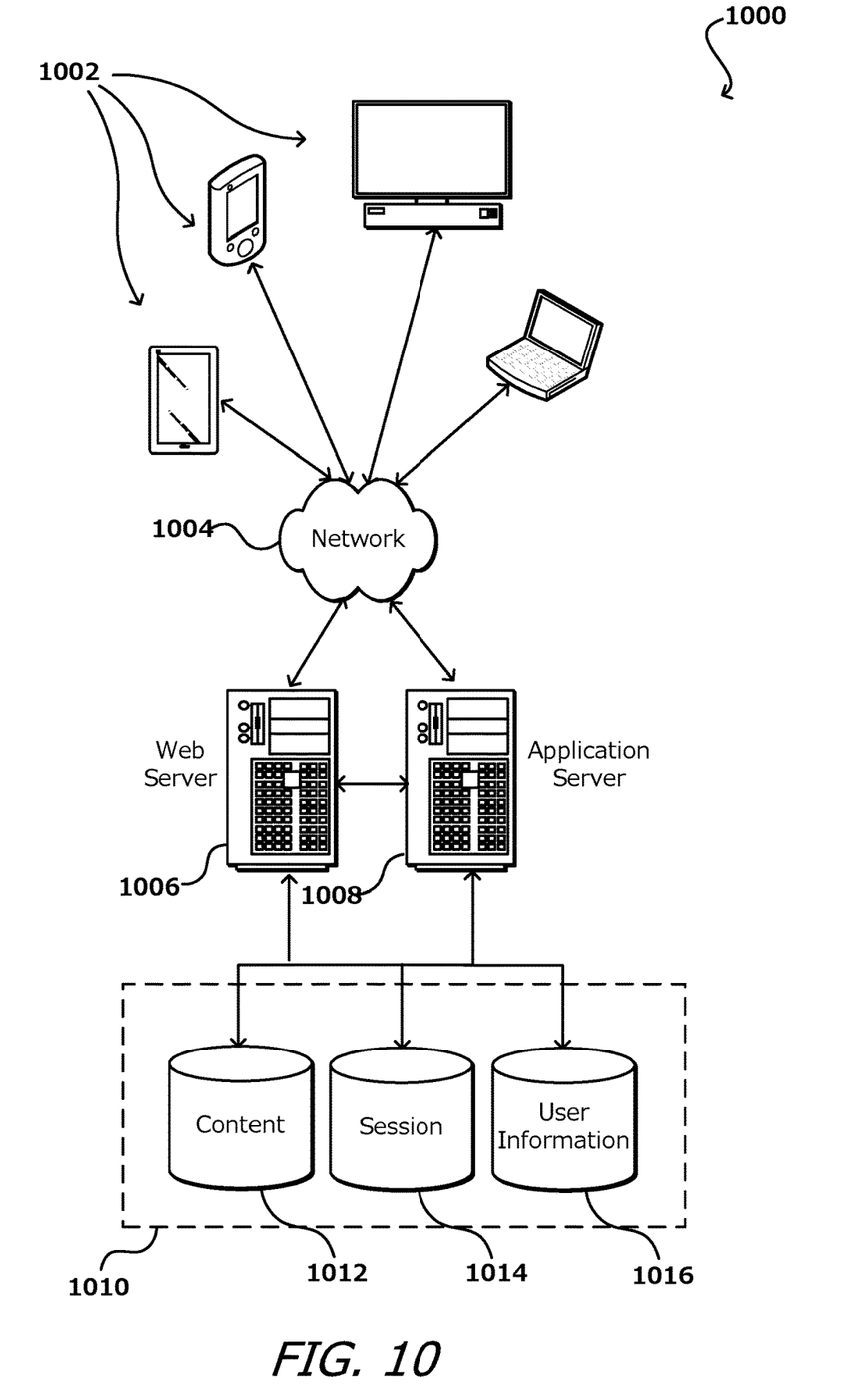
FIG. 10 illustrates an example environment for implementing aspects, in accordance with various embodiments of the present disclosure.

FIG. 10 illustrates an example environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail.

Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art. The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example.

The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein. The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, FTP, UPnP, NFS, and CIFS.

The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof.

The server(s) may also include database servers, including without limitation those commercially available from Oracle®, Microsoft®, Sybase® and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above.

The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
 at least one computing device processor; and
 a memory device including instructions that, when executed by the at least one computing device processor, cause the computing system to:
  receive communication from a client device over a network upon the client device detecting that an amount of cached content available for display is below a threshold amount of content, the communication including a request for additional content and a record of previous content impressions on the client device;
  access a database to look up a content plan associated with the client device, the content plan defining a plurality of content items and display instructions for the client and generated based on a profile of the client device and content display constraints;

determine a current state of the content plan based on the record of previous content impressions provided by the client device;

determine, based on the current state of the content plan, one or more content items to be displayed on the client device; and transmit the one or more content items to the client device to be cached on the client device, the client device instructed to display the one or more content items during upcoming content display opportunities respectively according to a client-side content display scheme.

2. The system of claim 1, wherein the instructions when executed further cause the system to:

execute content selection logic at a content provider environment remote from the client device, the content provider determining respective content items and display instructions for a network of client devices.

3. The system of claim 2, wherein the instructions when executed further cause the system to:

determine respective profiles associated with the network of client devices, an individual client device profile including at least one of: device type, user information, or historical usage data associated with the respective client device; and generate a master content plan that includes respective content plans for the network of client devices, the master content plan defining respective content items and display instructions for the network of client devices based at least in part on the respective profiles and content display constraints.

4. The system of claim 3, wherein the content display constraints include one or more local constraints and one or more global constraints, the local constraints defining content selection and ordering pertaining to individual client devices and the global constraints defining content selection and ordering across the network of client devices.

5. A computer-implemented method, comprising:

receiving, from a client device over a network, a request for content and impression data upon an amount of content stored on the client device available for display falling below a threshold amount of content, the impression data including data regarding previous content impressions on the client device;

determining a content plan for with the client device, the content plan including a plurality of content items and based at least in part on a profile of the client device and content display constraints;

determining a current state of the content plan based on the impression data;

selecting one or more content items from the plurality of content items based on the current state; and transmitting the one or more content items to the client device to be stored locally on the client device and displayed according to a client-side content display scheme.

6. The method of claim 5, wherein the one or more content items are transmitted to the client device in a sequence, and the client-side content display scheme includes displaying the one or more content items according to the sequence.

7. The method of claim 5, wherein the client-side content display scheme includes a maximum number of times a certain content item can be displayed per certain amount of time.

8. The method of claim 5, further comprising:

determining the profile associated with the client device, the profile including at least one of: device type, user demographic information, or historical behavior data.

9. The method of claim 8, wherein the content display constraints includes a target number or range of impressions of a certain content item on a single device or across a network of devices.

10. The method of claim 5, further comprising:

generating a master content plan that includes respective content plans for a network of client devices, the master content plan defining respective content items and display instructions for the network of client devices based at least in part on respective profiles of the network of client devices and content impression constraints.

11. The method of claim 5, further comprising:

detecting that the content plan does not exist or is expired; and generating or updating the content plan for the client device.

12. The method of claim 5, further comprising:

determining the number of content items to select and transmit to the client device based at least in part on one or more of: device type, an amount of time the client device is offline, a frequency of content impressions on the client device, usage data of the client device, or a user profile associated with the client device.

13. The method of claim 5, further comprising:

adjusting the number of content items to transmit to the client device based on a change to the content plan or a change in behaviors associated with the client device.

14. The method of claim 13, wherein the behaviors include at least a frequency of requests received from the client device.

15. The method of claim 5, further comprising:

validating that the one or more selected content items are currently available to be displayed by the client device.

16. A system, comprising:

at least one computing device processor; and a memory device including instructions that, when executed by the at least one computing device processor, cause the computing system to:

receive, from a client device over a network, a request for content and impression data upon an amount of content stored on the client device available for display falling below a threshold amount of content, the impression data including data regarding previous content impressions on the client device;

determine a content plan for with the client device, the content plan including a plurality of content items;

determine a current state of the content plan based on the impression data;

select one or more content items from the plurality of content items based on the current state; and transmit the one or more content items to the client device to be stored locally on the client device and displayed according to a client-side content display scheme.

17. The system of claim 16, wherein the one or more content items are transmitted to the client device in a sequence, and the client-side content display scheme includes displaying the one or more content items according to the sequence.

18. The system of claim 16, wherein the client-side content display scheme includes a maximum number of times a certain content item can be displayed per certain amount of time.

19. The system of claim 16, wherein the instructions when executed further cause the system to:
  determine the profile associated with the client device, the profile including at least one of: device type, user demographic information, or historical behavior data.

20. The system of claim 16, wherein the instructions when executed further cause the system to:
  determine the number of content items to select and transmit to the client device based at least in part on one or more of: device type, an amount of time the client device is offline, a frequency of content impressions on the client device, usage data of the client device, or a user profile associated with the client device.

* * * * *